United States Patent [19]

Long et al.

[11] Patent Number: 4,534,853
[45] Date of Patent: Aug. 13, 1985

[54] METHOD FOR CRACKING RESIDUAL OILS

[75] Inventors: Gary N. Long, Putnam Valley; Regis J. Pellet, Croton-on-Hudson; Jule A. Rabo, Armonk, all of N.Y.

[73] Assignee: Union Carbide Corporation, Danbury, Conn.

[21] Appl. No.: 543,359

[22] Filed: Oct. 19, 1983

[51] Int. Cl.³ .................. C10G 11/02; C10G 11/04
[52] U.S. Cl. ........................... 208/120; 502/79; 208/161
[58] Field of Search .................. 208/111, 113, 120

[56] References Cited

U.S. PATENT DOCUMENTS

| | | | |
|---|---|---|---|
| 3,216,789 | 11/1965 | Breck et al. | 423/329 |
| 3,607,043 | 9/1971 | McDaniel et al. | 208/120 |
| 4,331,533 | 5/1982 | Dean et al. | 208/113 |
| 4,332,674 | 6/1982 | Dean et al. | 208/120 |
| 4,336,160 | 6/1982 | Dean et al. | 208/113 |
| 4,348,369 | 9/1982 | Hinchey et al. | 423/328 |

OTHER PUBLICATIONS

Breck, "Zeolite Molecular Sieves", 1974, pp. 507–518.

Primary Examiner—D. E. Gantz
Assistant Examiner—O. Chaudhuri
Attorney, Agent, or Firm—Gary L. Wamer

[57] ABSTRACT

A residual oil conversion process which comprises converting residual oils and regenerating the conversion catalyst wherein the catalyst is selected from LZ-210, LZ-210-M, LZ-210-T, LZ-210-A and mixtures thereof and is a zeolitic aluminosilicate which has a mole ratio of oxide in the dehydrated state of

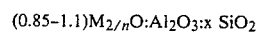

$$(0.85\text{--}1.1)M_{2/n}O:Al_2O_3:x\ SiO_2$$

wherein M is a cation having a valence of "n", "x" is the number of moles of $SiO_2$, said zeolitic aluminosilicate has a X-ray powder diffraction pattern having at least the d-spacings of Table A, and said zeolitic aluminosilicate has extraneous silicon atoms in the crystal lattice in the form of framework $SiO_4$ tetrahedra.

26 Claims, No Drawings

METHOD FOR CRACKING RESIDUAL OILS

FIELD OF THE INVENTION

The instant process relates to a new process for converting residual oils to hydrocarbon products using new zeolitic molecular sieves.

BACKGROUND OF THE INVENTION

The prior art generally identifies residual oils reduced crude oils, atmospheric tower bottoms, topped crudes, vacuum resids, or simply heavy oils. These high boiling portions of crude oils are also known as comprising refractory components, such as polycyclic aromatics and asphaltenes, which are considered difficult to catalytically crack to form high yields of gasoline and tend to form higher boiling hydrocarbon fractions because of the deposition of large amounts of coke on the cracking catalyst. Furthermore, metal contaminants in these heavy oil fractions contain metals such as sodium, vanadium, nickel, copper and iron, which may be deposited on and/or in the pores of the catalyst thereby poisoning and/or inactivating the catalyst. The coking tendencies of the heavy oil fractions plus the heavy metals effect are so overpowering that zeolites subjected to such conditions are generally considered unacceptable for commercial processes.

Residual oils comprising relatively high boiling fractions of crude oil may be obtained as atmospheric tower bottoms and/or vacuum tower bottoms contained therein and are generally regarded as distress stocks by the petroleum industry because such oils contain large quantities of components generally considered to have strong coke forming tendencies, as well as having heavy metal components. For example, residual oils may contain carbon residues in excess of 0.6% by weight, and this characteristic is generally considered by the petroleum industry to contribute to the production of high coking in a cracking operation. This high coking in conjunction with the high heavy metal levels will operate to rapidly deactivate the cracking catalyst and, thus, lead to uneconomical operation of the cracking process. These problems have tended to result in expensive processes to effect the elimination of these materials from cracking feeds.

"Residual oils" for the purpose of this invention include crude oil fractions boiling between 400° F. and the final end boiling point of a crude oil, often in excess of 1800° F. The residual oil feedstock can be light gas oils boiling from about 400° F. to 700° F., medium gas oils boiling from about 600° F. to 850° F., heavy gas oils boiling from about 600° F. to 1200° F. and/or components boiling beyond 1200° F. up to the final boiling point of the crude oil, including carbon producing components, such as polycyclic aromatics, asphaltenes and metal contaminants, as well as whole crudes. Separately prepared feedstocks, such as those prepared by solvent extraction of hydrogenated stocks, may also be employed as feedstocks in the process.

It is generally considered that the fluid catalytic cracking of hydrocarbon feeds containing components boiling beyond 1200° F. leads to poor conversion to gasoline and lighter components, high coke production and generation of excessive temperature during the catalyst regeneration. The excessive regeneration temperatures are considered harmful both to conventional equipment and to the catalyst employed in the cracking process.

The instant process relates to the conversion of both the high and low boiling crude oil fractions contained in residual oils. The process provides the high selectivity to gasoline and lighter components with low coke production as set forth in U.S. Pat. Nos. 4,332,674 and 4,331,533, incorporated herein by reference thereto (generally referred to herein as the "HT Process") while providing improvements over the processes disclosed in such patents.

The instant process relates to the problems of high regenerator and catalyst temperatures. The instant invention enables the use of high catalyst regeneration temperatures by taking advantage of special cracking catalysts capable of providing cracking activity at the high regenerator and catalyst temperatures. The instant process operates at high temperatures and takes advantage of the high conversion and high selectivity to gasoline and products which are gasoline precursors on a once through basis without excessive coke formation.

SUMMARY OF THE INVENTION

The instant process comprises a method for converting residual oils wherein said method comprises charging hot particles of catalyst at a temperature above 1400° F. and at least equal to the pseudo-critical temperature of a hydrocarbon feed comprising residual oils to the lower portion of a riser conversion zone for flow upwardly therethrough, charging the residual oils to said riser conversion zone as a multiplicity of separate streams so as to substantially completely vaporize vaporizable components of the feed whereby thermal and catalytic cracking of the feed is accomplished and recovering a hydrocarbon product of said thermal and catalytic cracking of the feed separate from catalyst particles wherein the improvement comprises employing a catalyst comprising a zeolitic aluminosilicate which has a mole ratio of oxide in the dehydrated state of

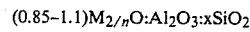

$$(0.85-1.1)M_{2/n}O:Al_2O_3:xSiO_2$$

wherein M is a cation having a valence of "n"; "x" is the number of moles of $SiO_2$; said zeolitic aluminosilicate has a X-ray powder diffraction pattern having at least the d-spacings of Table A; and said zeolitic aluminosilicate has extraneous silicon atoms in the crystal lattice in the form of framework $SiO_4$ tetrahedra.

DETAILED DESCRIPTION OF THE INVENTION

The instant process provides improvements over the "high temperature processes" disclosed in U.S. Pat. Nos. 4,332,674 and 4,331,533 by providing a new zeolitic catalyst for use in such processes. This new zeolitic catalyst is both thermally and hydrothermally stable at the high temperatures of regeneration and cracking. These "high temperature processes" will be referred to herein for convenience as the "HT Process" as generally designating the high temperature cracking processes of U.S. Pat. Nos. 4,332,674 and 4,331,533.

The "HT Process" of U.S. Pat. Nos. 4,331,533 and 4,332,674 has one well known but critical limitation. The patentees, at the 1983 NPRA Annual Meeting, March 20-22, 1983 San Francisco, Calif., have noted that currently available zeolitic catalysts only have thermal stability up to 1500° F. Unfortunately, for the HT Process to benefit totally from both high temperature regeneration and cracking it is important to have a catalyst which is thermally and hydrothermally stable at temperatures above 1500° F. The instant process comprises an improved HT Process which employs catalysts which have thermal and hydrothermal stability at temperatures above 1500° F.

The zeolitic catalysts to be employed in the instant process include the zeolitic materials "LZ-210". "LZ-210-M", "LZ-210-T", and "LZ-210-A", described in: U.S. Ser. No. 315,853 now Pat. No. 4,503,023, filed Oct. 28, 1981 (LZ-210); U.S. Ser. No. 490,965, now abandoned, filed May 2, 1983 (LZ-210-M and LZ-210-T); and in U.S. Ser. No. 500,446, filed June 2, 1983 (LZ-210-A). The aforementioned applications are incorporated herein by reference thereto.

The general nature of the HT Process as described in the aforementioned patents, is characterized by high temperature catalyst particles being charged to the riser conversion zone concurrently with the residual oil feedstock.

The instant process obviates, at least in part, the acknowledged problems which arise from the use of conventional FCC catalysts in the HT Process by providing a zeolitic catalyst which is not only stable (both thermally and hydrothermally) at the regeneration and cracking temperatures employed in the HT Process but also at temperatures above the upper process temperature of 1800° F. As noted in column 7, lines 19 to 25 of U.S. Pat. No. 4,332,674:

"The high activity catalysts presently employed in catalytic cracking are not structurally thermo-stable at the high regenerator temperatures of the invention if this severe regeneration is conducted in a single stage or even in a multi-stage regenerator where the multi stages are contained in a single vessel. Two very basic factors affect the catalyst stability during regeneration. At higher and higher coke levels on the spent catalysts, higher and higher catalyst particulate temperatures are developed as the high level of coke is burned in a single vessel even if multi stage single vessel regeneration is employed. These high surface temperatures themselves will render the catalyst ineffective. Secondly, the catalyst deactivates rapidly at high temperatures when the steam formed during coke combustion from associated molecular hydrogen is allowed to remain in contact with the catalyst when the catalyst reaches its highest temperature."

The lack of thermal stability of conventional FCC catalysts is further aggravated by the presence of steam, as above noted, since presently employed cracking catalysts tend to be even more hydrothermally unstable than they are thermally unstable at the high regeneration and cracking temperatures. The cracking catalysts of the instant invention are unique in that they are both thermally and hydrothermally stable at the temperature employed for cracking and regeneration.

The zeolites employed in the catalysts employed in the process of the present invention will be referred to herein, solely for the purpose of reference herein, as (1) "LZ-210", (2) "LZ-210-T", (3) "LZ-210-M" and (4) "LZ-210-A" to denominate, respectively (1) LZ-210, (2) an LZ-210 catalyst which has been subjected to a thermal treatment, including a hydrothermal treatment, (3) an LZ-210 catalyst which has been subjected to a treatment with a multivalent cation and, optionally, thermal treatment, and (4) an LZ-210 catalyst which has been treated with a cation of Group IIIA and, optionally, thermal treatment. These designations are used consistent with the aforementioned copending patent applications relating to such zeolitic aluminosilicates. When the catalyst herein is LZ-210, LZ-210-M, and/or LZ-210-T the $SiO_2$ to $Al_2O_3$ ratio is greater than 6.0, and when the catalyst is LZ-210-A the $SiO_2$ to $Al_2O_3$ ratio is greater than 7.0. The $SiO_2$ to $Al_2O_3$ ratio for LZ-210 and LZ-210-T are preferably greater than 8.0 and the $SiO_2$ to $Al_2O_3$ ratio for LZ-210-M is preferably greater than 6.0 and less than 8.0. Other components may be provided with LZ-210, LZ-210-T, LZ-210-M and LZ-210-A to provide the final catalytic cracking catalyst and exemplary of such other components will be discussed hereinafter.

LZ-210-T, LZ-210-M and LZ-210-A are prepared from LZ-210 as described in U.S. Ser. No. 315,853, above mentioned with a general description of LZ-210 being as follows.

LZ-210

Aluminosilicates having in the dehydrated state, a chemical composition expressed in terms of mole ratios of oxides as $$(0.85-1.1)M_{2/n}O:Al_2O_3:xSiO_2$$

wherein "M" is a cation having the valence "n"; and "x" has a value greater than 6 (preferably greater than 8.0 for LZ-210 and LZ-210-T, preferably greater than 7.0 for LZ-210-A and preferably greater than 6.0 and less than 8.0 for LZ-210-M); having an X-ray powder diffraction pattern having at least the d-spacings set forth in Table A, below; and having extraneous silicon atoms in its crystal lattice in the form of $SiO_4$ tetrahedra, preferably in an average amount of at least 1.0 per 10,000 $Å^3$. For the instant process the value of "x" is related to whether the catalyst comprises LZ-210, LZ-210-M, LZ-210-T or LZ-210-A. For purposes of reference herein the framework composition is best expressed in terms of mole fractions of framework tetrahedra $TO_2$. The starting zeolite may be expressed as:

$$(Al_aSi_b\square_z)O_2$$

whereas "a" is the mole fraction of aluminum tetrahedra in the framework; "b" is the mole fraction of silicon tetrahedra in the framework; $\square$ denotes defect sites and "z" is the mole fraction of defect sites in the zeolite framework. In many cases the "z" value for the starting zeolite is zero and the defect sites are simply eliminated from the expression. Numerically the sum of the values $a+b+z=1$.

The zeolite product of the fluorosilicate treatment, expressed in terms of mole fraction of framework tetrahedra $(TO_2)$ will have the form $$[Al_{(a-N)}Si_{b+(N-\Delta z)}\square_z]O_2$$

wherein: "N" is defined as the mole fraction of aluminum tetrahedra removed from the framework during the treatment; "a" is the mole fraction of aluminum tetrahedra present in the framework of the starting zeolite; "b" is the mole fraction of silicon tetrahedra present in the framework of the starting zeolite; "z" is the mole fraction of defect sites in the framework; $(N-\Delta z)$ is the mole fraction increase in silicon tetrahedra resulting from the fluoro-silicate treatment; "$\Delta z$" is the net change in the mole fraction of defect sites in the zeolite framework resulting from the treatment $\Delta z = z(\text{product zeolite}) - z(\text{starting zeolite})$. The term "Defect Structure Factor" for any given zeolite is equivalent to the "z" value of the zeolite. The net change in Defect Structure Factors between the starting zeolite and the product zeolite is equivalent to "$\Delta z$". Numerically, the sum of the values:

$$(a-N) + [b+(N-\Delta z)] + z = 1$$

A subclass of the above LZ-210 compositions, i.e. those which are characterized by having both high molar $SiO_2/Al_2O_3$ ratios and low Defect Structure Factors (as hereinafter discussed), can be defined as having a chemical composition expressed in terms of mole fractions of framework tetrahedra as:

$$[Al_{(a-N)}Si_{b+(N-\Delta z)}\square_z]O_2$$

wherein: the mole fraction of aluminum removed from the framework of the starting zeolite is "N";

$$\frac{b + (N - \Delta z)}{(a - N)}$$

has a value greater than 6 (preferably greater than 8.0 for LZ-210 and LZ-210-T, preferably greater than 7.0 for LZ-210-A and preferably greater than 6.0 and less than 8.0 for LZ-210-M), the change in defect structure factor $\Delta z$ is less than 0.08 and preferably less than 0.05; an increased silicon content in the framework, $(N-\Delta z)/N$, of at least 0.5; and a cation equivalent expressed as a monovalent cation species, $M^+/Al$, from 0.85 to 1.1 and the characteristic crystal structure of zeolite Y as indicated by an X-ray powder diffraction pattern having at least the d-spacings set forth broadly in Table A.

TABLE A

| d(A) | Intensity |
|---|---|
| 14.3–13.97 | very strong |
| 8.71–8.55 | medium |
| 7.43–7.30 | medium |
| 5.66–5.55 | strong |
| 4.75–4.66 | medium |
| 4.36–4.28 | medium |
| 3.75–3.69 | strong |
| 3.30–3.23 | strong |
| 2.85–2.79 | strong |

Zeolite LZ-210 as defined above, such being prior to use in the instant process, will have cubic unit cell dimension, $a_o$, of less than 24.61 Angstroms, preferably from 24.20 to 24.61 Angstroms and, an adsorption capacity for water vapor at 25° C. and 4.6 Torr water vapor pressure of at least 20 weight percent based on the anhydrous weight of the zeolite, and preferably an oxygen adsorption capacity at 100 Torr and $-183°$ C. of at least 25 weight percent.

LZ-210 can be prepared by a method which removes framework aluminum from a zeolite having $SiO_2/A_2O_3$ molar ratios of about 3 or greater and substituting therefor silicon from a source extraneous to the starting zeolite. By such a procedure it is possible to create more highly siliceous zeolite species which have the same crystal structure as would result by direct synthesis if such synthesis method were known. The process disclosed in copending U.S. Ser. No. 315,853 comprises contacting a crystalline zeolite having pore diameters of at least about 3 Angstroms and having a molar $SiO_2/Al_2O_3$ ratio of at least 3, with a fluorosilicate salt, preferably in an amount of at least 0.0075 moles per 100 grams of zeolite starting material, said fluorosilicate salt being in the form of an aqueous solution having a pH value in the range of 3 to about 7, preferably 5 to about 7, and brought into contact with the zeolite either incrementally or continuously at a slow rate whereby framework aluminum atoms of the zeolite are removed and replaced by extraneous silicon atoms from the added fluorosilicate.

LZ-210 can be prepared from a conventionally prepared zeolite Y which has a molar $SiO_2/Al_2O_3$ ratio of less than 6 by using the above process to increase the $SiO_2/Al_2O_3$ ratio to greater than 6. A preferred procedure comprises:

(a) providing a zeolite Y composition having a molar $SiO_2/Al_2O_3$ ratio less than that of the final product;

(b) contacting and reacting at a temperature of from 20° to 95° C., said zeolite Y with a fluorosilicate, preferably ammonium fluorosilicate. The fluorosilicate solution, being in the form of an aqueous solution at a pH in the range of 5 to about 7, is brought into contact with the zeolite either incrementally or continuously at a slow rate such that a sufficient proportion of the framework aluminum atoms removed are replaced by silicon atoms to retain at least 80 percent, preferably at least 90 percent, of the crystal structure of the starting zeolite Y; and (c) isolating the zeolite having an enhanced framework silicon content from the reaction mixture.

The starting zeolite Y composition can be synthesized by any of the processes well known in the art. A representative process is disclosed in U.S. Pat. No. 3,130,007.

For reasons more fully explained hereinafter, it is necessary that the starting zeolite be able to withstand the initial loss of framework aluminum atoms to at least a modest degree without collapse of the crystal structure unless the process is to be carried out at a very slow pace. Accordingly it is preferred that the $SiO_2/Al_2O_3$ ratio of the starting zeolite be at least 3.0. Also it is preferred that at least about 50, and more preferably at least 95%, of the $AlO_4^-$ tetrahedra of the naturally occurring or as-synthesized zeolite are present in the starting zeolite. Most advantageously the starting zeolite contains as many as possible of its original $AlO_4^-$ tetrahedra, i.e. has not been subjected to any post-formation treatment which either extensively removes aluminum atoms from their original framework sites or converts them from the normal conditions of 4-fold coordination with oxygen.

The cation population of the starting zeolite is not a critical factor insofar as substitution of silicon for framework aluminum is concerned, but since the substitution mechanism involves the in situ formation of salts of at least some of the zeolitic cations, it is advantageous that these salts be water-soluble to a substantial degree to facilitate their removal from the silica-enriched zeolite product. It is found that ammonium cations for the most soluble salt in this regard and it is accordingly preferred that at least 50 percent, most preferably 85 or more percent, of the zeolite cations be ammonium cations. Sodium and potassium, two of the most common original cations in zeolites are found to form $Na_3AlF_6$ and $K_3AlF_6$ respectively, both of which are only very sparingly soluble in either hot or cold water. When these compounds are formed as precipitates within the structural cavities of the zeolite they are quite difficult to remove by water washing. Their removal, moreover, is important if thermal stability of the zeolite product is desired since the substantial amounts of fluoride can cause crystal collapse at temperatures as low as 500° C.

The fluorosilicate salt used as the aluminum extractant and also as the source of extraneous silicon which is inserted into the zeolite structure in place of the extracted aluminum can be any of the fluorosilicate salts having the general formula $$(A)_{2/b}SiF_6$$

wherein A is preferably a metallic or non-metallic cation other than $H^+$ having the valence "b". Cations represented by "A" are alkylammonium. $NH_4^+$, $H^+$, $Mg^{++}$, $Li^+$, $Na^+$, $K^+$, $Ba^{++}$, $Cd^{++}$, $Cu^+$, $Cu^{++}$, $Ca^{++}$, $Cs^+$, $Fe^{++}$, $Co^{++}$, $Pb^{++}$, $Mn^{++}$, $Rb^+$, $Ag^+$, $Sr^{++}$, $Tl^+$ and $Zn^{++}$. The ammonium cation form of the fluorosilicate is highly preferred because of its substantial solubility in water and also because the ammonium cations form water soluble by-product salts upon reaction with the zeolite, namely $(NH_4)_3AlF_6$.

In certain respects, the manner in which the fluorosilicate and starting zeolite are brought into contact and the overall process of substituting silicon for aluminum in the zeolite framework is a two step process in which the aluminum extraction step will, unless controlled, proceed very rapidly while the silicon insertion is relatively very slow. If dealumination becomes too extensive without silicon substitution, the crystal structure becomes seriously degraded and ultimately collapses. While we do not wish to be bound by any particular theory, it appears that the fluoride ion is the agent for the extraction of framework aluminum in accordance with the equation

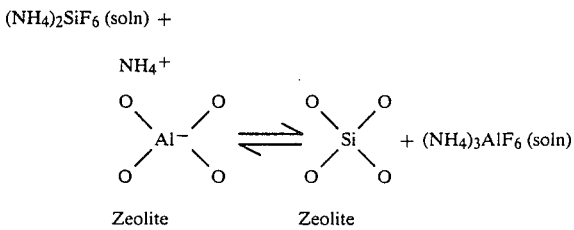

It is, therefore, essential that the initial dealumination step be inhibited and the silicon insertion step be promoted to achieve the desired zeolite product. It is found that the various zeolite species have varying degrees of resistance toward degradation as a consequence of framework aluminum extraction without silicon substitution. In general the rate of aluminum extraction is decreased as the pH of the fluorosilicate solution in contact with the zeolite is increased within the range of 3 to 7, and as the concentration of the fluorosilicate in the reaction system is decreased. Also increasing the reaction temperature tends to increase the rate of silicon substitution. Whether it is necessary or desirable to buffer the reaction system or strictly limit the fluorosilicate concentration is readily determined for each zeolite species by routine observation.

Theoretically, there is no lower limit for the concentration of fluorosilicate salt in the aqueous solution employed, provided of course the pH of the solution is high enough to avoid undue destructive acidic attack on the zeolite structure apart from the intended reaction with the fluorosilicate. Very slow rates of addition of fluorosilicate salts insure that adequate time is permitted for the insertion of silicon as a framework substitute for extracted aluminum before excessive aluminum extraction occurs with consequent collapse of the crystal structure. Practical commercial considerations, however, require that the reaction proceed as rapidly as possible, and accordingly the conditions of reaction temperature and reagent concentrations should be optimized with respect to each zeolite starting material. In general the more highly siliceous the zeolite, the higher the permissible reaction temperature and the lower the suitable pH conditions. In general the preferred reaction temperature is within the range of 50° to 95° C., but temperatures as high as 125° C. and as low as 20° C. have been suitably employed in some instances. At pH values below about 3 crystal degradation is generally found to be unduly severe, whereas at pH values higher than 7, silicon insertion is unduly slow. The maximum concentration of fluorosilicate salt in the aqueous solution employed is, of course, interdependent with the temperature of pH factors and also with the time of contact between the zeolite and the solution and the relative proportions of zeolite and fluorosilicate. Accordingly it is possible that solutions having fluorosilicate concentrations of from about $10^{-3}$ moles per liter of solution up to saturation can be employed, but it is preferred that concentrations in the range of 0.5 to 1.0 moles per liter of solution be used. These concentration values are with respect to true solutions, and are not intended to apply to the total fluorosilicate in slurries of salts in water. As illustrated hereinafter, even very slightly soluble fluorosilicates can be slurried in water and used as a reagent—the undissolved solids being readily available to replace dissolved molecular species consumed in reaction with the zeolite. As stated hereinabove, the amount of dissolved fluorosilicates employed with respect to the particular zeolite being treated will depend to some extent upon the physical and chemical properties of the individual zeolites as well as other specifications herein contained in this application. However, the minimum value for the amount of fluorosilicate to be added should be at least equivalent to the minimum mole fraction of aluminum to be removed from the zeolite.

In this disclosure, including the appended claims, in specifying proportions of zeolite starting material or adsorption properties of the zeolite product, and the like, the anhydrous state of the zeolite will be intended unless otherwise stated. The anhydrous state is considered to be that obtained by heating the zeolite in dry air at 100° C. for about 1 to 2 hours.

It is apparent from the foregoing that, with respect to reaction conditions, it is desirable that the integrity of the zeolite crystal structure is substantially maintained throughout the process, and that in addition to having extraneous (non-zeolitic) silicon atoms inserted into the lattice, the zeolite retains at least 80 and preferably at least 90 percent of its original crystallinity. A convenient technique for assessing the crystallinity of the products relative to the crystallinity of the starting material is the comparison of the relative intensities of the d-spacings of their respective X-ray powder diffraction patterns. The sum of the peak heights, in terms of arbitrary units above background, of the starting material is used as the standard and is compared with the corresponding peak heights of the products. When, for example, the numerical sum of the peak heights of the product is 85 percent of the value of the sum of the peak heights of the starting zeolite, then 85 percent of the crystallinity has been retained. In practice it is common to utilize only a portion of the d-spacing peaks for this purpose, as for example, five of the six strongest d-spacings. In zeolite Y these d-spacings correspond to the Miller Indices 331, 440, 533, 642 and 555. Other indicia of the crystallinity retained by the zeolite product are the degree of retention of surface area and the degree of retention of the adsorption capacity. Surface areas can be determined by the well-known Brunauer-Emmett-Teller method (B-E-T). J. Am. Chem. Soc. 60 309 (1938) using nitrogen as the adsorbate. In determining the adsorption capacity, the capacity for oxygen at −183° C. at 100 Torr is preferred.

All available evidence, the date, indicates that the above described process is unique in being able to produce zeolites essentially free of defect structure yet having molar $SiO_2/Al_2O_3$ ratios higher than those heretofore obtained by direct hydrothermal synthesis i.e., no other process is known to date for preparing LZ-210. The products resulting from the operation of the process share the common characteristic of having a higher molar $SiO_2/Al_2O_3$ ratio than previously obtained for each species by direct hydrothermal synthesis by virtue of containing silicon from an extraneous, i.e. non-zeolitic, source, preferably in conjunction with a crystal structure which is characterized as containing a low level of tetrahedral defect sites. This defect structure, if present, is revealed by the infrared spectrum of zeolites in the hydroxyl-stretching region.

In untreated, i.e. naturally occurring or as-synthesized zeolites the original tetrahedral structure is conventionally represented as

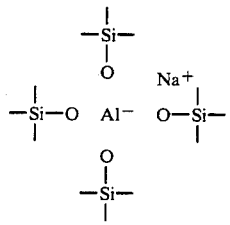

After treatment with a complexing agent such as ethylene-diaminetetraacetic acid ($H_4EDTA$) in which a stoichiometric reaction occurs whereby framework aluminum atoms along with an associated cation such as sodium is removed as NaAlEDTA, it is postulated that the tetrahedral aluminum is replaced by four protons which form a hydroxyl "nest", as follows:

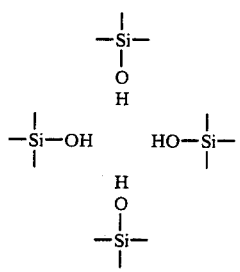

The infrared spectrum of the aluminum depleted zeolite will show a broad nondescript adsorption band beginning at about 3750 cm$^{-1}$ and extending to about 3000 cm$^{-1}$. The size of this absorption band or envelope increases with increasing aluminum depletion of the zeolite. The reason that the absorption band is so broad and without any specific absorption frequency is that the hydroxyl groups in the vacant sites in the framework are coordinated in such a way that they interact with each other (hydrogen bonding). The hydroxyl groups of adsorbed water molecules are also hydrogen-bonded and produce a similar broad absorption band as do the "nest" hydroxyls. Also, certain other zeolitic hydroxyl groups, exhibiting specific characteristic absorption frequencies within the range of interest, will if present, cause infrared absorption bands in these regions which are superimposed on the band attributable to the "nest" hydroxyl groups. These specific hydroxyls are created by the decomposition of ammonium cations or organic cations present in the zeolite.

It is, however, possible to treat zeolites, prior to subjecting them to infrared analysis, to avoid the presence of the interferring hydroxyl groups and thus be able to observe the absorption attributable to the "nest" hydroxyls only. The hydroxyls belonging to adsorbed water were avoided by subjecting the hydrated zeolite sample to vacuum activation at a moderate temperature of about 200° C. for about 1 hour. This treatment permits desorption an removal of the absorbed water. Complete removal of adsorbed water can be ascertained by noting when the infrared absorption band at about 1640 cm$^{-1}$, the bending frequency of water molecules, has been removed from the spectrum.

The decomposable ammonium cations can be removed, at least in large part, by ion-exchange and replaced with metal cations, preferably by subjecting the ammonium form of the zeolite to a mild ion exchange treatment with an aqueous NaCl solution. The OH absorption bands produced by the thermal decomposition of ammonium cations are thereby avoided. Accordingly the absorption band over the range of 3745 cm$^{-1}$ to about 3000 cm$^{-1}$ for a zeolite so treated is almost entirely attributable to hydroxyl groups associated with defect structure and the absolute absorbance of this band can be a measure of the degree of aluminum depletion.

It is found, however, that the ion-exchange treatment, which must necessarily be exhaustive even though mild, required considerable time. Also the combination of the ion-exchange and the vacuum calcination to remove adsorbed water does not remove every possible hydroxyl other than defect hydroxyls which can exhibit absorption in the 3745 cm$^{-1}$ to 3000 cm$^{-1}$ range. For instance, a rather sharp band at 3745 cm$^{-1}$ has been attributed to the Si-OH groups situated in the terminal lattice positions of the zeolite crystals and to amorphous (non-zeolitic) silica from which physically adsorbed water has been removed. For these reasons we prefer to use a somewhat different criterion to measure the degree of defect structure in the zeolite products of this invention.

In the absence of hydrogen-bonded hydroxyl groups contributed by physically adsorbed water, the absorption frequency least affected by absorption due to hydroxyl groups other than those associated with framework vacancies or defect sites is at 3710±5 cm$^{-1}$. Thus the relative number of defect sites remaining in a zeolite product of this invention can be gauged by first removing any adsorbed water from the zeolite, determining the value of the absolute absorbance in its infrared spectrum at a frequency of 3710 cm$^{-1}$, and comparing that value with the corresponding value obtained from the spectrum of a zeolite having a known quantity of defect structure. The following specific procedure has been arbitrarily selected and used to measure the amount of defect structure in the products prepared in the Examples appearing hereinafter. Using the data obtained from this procedure it is possible, using simple mathematical calculation, to obtain a single and reproducible value hereinafter referred to as the "Defect Structure Factor", denoted hereinafter by the symbol "z", which can be used in comparing and distinguishing the present novel zeolite compositions from their less-siliceous prior known counterparts and also with equally siliceous prior known counterparts prepared by other techniques.

DEFECT STRUCTURE FACTOR

(A) Defect Structure Zeolite Standard

Standards with known amounts of defect structure can be prepared by treating a crystalline zeolite of the same species as the product sample with ethylenediaminetetraacetic acid by the standard procedure of Kerr as described in U.S. Pat. No. 3,442,795. In order to prepare the standard it is important that the starting zeolite be well crystallized, substantially pure and free from defect structure. The first two of these properties are readily determined by conventional X-ray analysis and the third by infrared analysis using the procedure set forth in part (B) hereof. The product of the aluminum extraction should also be well crystallized and substantially free from impurities. The amount of aluminum depletion, i.e., the mole fraction of tetrahedral defect structure of the standard samples can be ascertained by conventional chemical analytical procedure. The molar SiO$_2$/Al$_2$O$_3$ ratio of the starting zeolite used to prepare the standard sample in any given case is not narrowly critical, but is preferably within about 10% of the molar SiO$_2$Al$_2$O$_3$ ratio of the same zeolite species used as the starting material in the practice of the process of the present invention.

(B) Infrared Spectrum of Product Samples and Defect Structure Zeolite Standard Fifteen milligrams of the hydrated zeolite to be analyzed are pressed into a 13 mm. diameter self-supporting wafer in a KBr die under 5000 lbs. pressure. The wafer is then heated at 200° C. for 1 hour at a pressure of not greater than 1×10$^{-4}$ mm. Hg to remove all observable traces of physically adsorbed water from the zeolite. This condition of the zeolite is evidenced by the total absence of an infrared adsorption band at 1640 cm$^{-1}$. Thereafter, and without contact with adsorbable substances, particularly water vapor, the infrared spectrum of the wafer is obtained on an interferometer system at 4 cm$^{-1}$ resolution over the frequency range of 3745 to 3000 cm$^{-1}$. Both the product sample and the standard sample are analyzed using the same interferometer system to avoid discrepancies in the analysis due to different apparatus. The spectrum, normally obtained in the transmission mode of operation is mathematically converted to and plotted as wave number vs. absorbance.

(C) Determination of the Defect Structure Factor

The defect structure factor (z) is calculated by substituting the appropriate data into the following formula:

$$z = \frac{AA_{(ps)} \times \text{(Mole fraction of defects in the standard)}}{AA_{(std)}}$$

wherein AA$_{(ps)}$ is the infrared absolute absorbance measured above the estimated background of the product sample at 3710 cm$^{-1}$; AA$_{(std)}$ is the absolute absorbance measured above the background of the standard at 3710 cm$^{-1}$ and the mole fraction of defects in the standard are determined in accordance with part (A) above.

Once the defect structure factor, z, is known, it is possible to determine from wet chemical analysis of the product sample for SiO$_2$, Al$_2$O$_3$ and the cation content as M$_{2/n}$O whether silicon has been substituted for aluminum in the zeolite as a result of the treatment and also the efficiency of ay such silicon substitution.

The fact that the present process results in zeolite products having silicon substituted for aluminum in the framework is substantiated by the framework infrared spectrum in addition to the hydroxyl region infrared spectrum. In the former, there is a shift to higher wave numbers of the indicative peaks and some sharpening thereof in the case of the present products, as compared to the starting zeolite, which is due to an increased SiO$_2$/Al$_2$O$_3$ molar ratio.

The essential X-ray powder diffraction patterns appearing in this specification and referred to in the appended claims are obtained using standard X-ray powder diffraction techniques. The radiation source is a high-intensity, copper target, x-ray tube operated at 50 Kv and 40 ma. The diffraction pattern from the copper K alpha radiation and graphite monochromator is suitably recorded by an X-ray spectrometer scintillation counter, pulse-height analyzer and strip-chart recorder. Flat compressed powder samples are scanned at 2° (2 theta) per minute, using a 2 second time constant. Interplanar spacings (d) are obtained from the position of the diffraction peaks expressed as 2 theta, where 2 theta is the Bragg angle as observed on the strip chart. Intensities are determined from the heights of diffraction peaks after subtracting background.

In determining the cation equivalency, i.e. the molar ratio M$_{2/n}$O/Al$_2$O$_3$. in each zeolite product, it is advantageous to perform the routine chemical analysis on a form of the zeolite in which "M" is a monovalent cation other than hydrogen. This avoids the uncertainty which can arise in the case of divalent or polyvalent metal zeolite cations as to whether the full valence of the cation is employed in balancing the net negative charge associated with each AlO$_4^-$ tetrahedron or whether some of the positive valence of the cation is used in bonding with OH$^-$ or H$_3$O$^+$ ions.

The preferred novel crystalline aluminosilicate compositions of the present invention will contain a chemical or molar framework composition which can be determined from the expression of mole fractions of framework tetrahedra previously described:

$$[Al_{(a-N)}Si_{b+(N-\Delta z)}\square_z]O_2$$

wherein: the framework Si/Al ratio is determined by

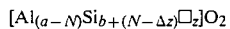

and is numerically greater than 3, the mole fraction of silicon tetrahedra substituted into the framework of the product zeolite (N−Δz) is increased by at least a value for (N−Δz)/N which is numerically equal to or greater than 0.5, the change in Defect Structure Factor Δz is increased by less than 0.08 and preferably less than 0.05.

Moreover, regardless of the Defect Structure Factor of any zeolite material which has been treated according to the present process, it is novel by virtue of having had extraneous silicon inserted into its crystal lattice and having a molar $SiO_2/Al_2O_3$ ratio greater than heretofore obtained by direct hydrothermal synthesis. This is necessarily the case since all other methods for increasing the $SiO_2/Al_2O_3$ ratio of a zeolite crystal must remove framework aluminum atoms, and unless at least one of those removed aluminum atoms is replaced by a silicon atom from a source other than the crystal itself, the absolute defect structure content of the crystal must be greater than that of LZ-210.

LZ-210-T, LZ-210-M and LZ-210-A

The catalysts referred to herein are prepared from LZ-210 materials having a $SiO_2$ to $Al_2O_3$ ratio of greater than 6.0. LZ-210-A is prepared from LZ-210 materials with a $SiO_2$ to $Al_2O_3$ ratios greater than 7.0. LZ-210-T is preferably prepared from LZ-210 materials with a $SiO_2$ to $Al_2O_3$ ratios greater than 8.0. LZ-210-M is prepared from LZ-210 materials with a $SiO_2$ to $Al_2O_3$ ratio greater than 6.0 and less than 8.0.

The term "thermal treatment" is employed here to denominate both a thermal calcination and a hydrothermal calcination (thermal calcination in the presence of steam). The thermal treatment is carried out at an effective temperature and time and when the thermal treatment is also a hydrothermal treatment it is carried out in the presence of an effective amount of steam, to provide an LZ-210 derived catalyst of the instant invention, referred to herein as LZ-210-T. The thermal treatment is typically carried out at a temperature in excess of 300° C. for a period in excess of 0.25 hours and when the thermal treatment is a hydrothermal treatment it is typically carried out in the presence of at least about 20 percent steam by volume in air. The source of the steam is not important and may be provided from an external source or may be generated in situ at the temperatures employed for the hydrothermal treatment.

LZ-210-M is prepared by ion-exchange or impregnation of LZ-210, which, optionally, has been subjected to thermal treatment as hereinafter discussed, by contacting the LZ-210 with a solution of at least one multivalent cation selected from the group consisting of cations of Group IIA, and rare earth cations selected from the group consisting of cerium, lanthanum, praseodymium, neodymium, promethium, samarium, europium, gadolinium, terbium, dysprosium, holmium, erbium, thulium, ytterbium, lutetium and mixtures thereof. As a result of ion-exchange of the LZ-210 at least one multivalent cation, e.g., rare earth cation, is ion-exchanged with the cations initially present in LZ-210. The multivalent cation is preferably present in an effective amount that removes at least about 2 ion exchange percent of the cations present in the starting LZ-210 material and is typically present in an effective amount greater than about 5.0 ion exchange percent and preferably between about 16 ion exchange percent and about 80 ion exchange percent.

The process for the preparation of LZ-210-T and LZ-210-M comprises treatment of an LZ-210 having a $SiO_2$ to $Al_2O_3$ ratio value greater than 6.0, with at least one of the following steps of:
 (i) treating the aluminosilicate at an effective temperature for an effective time; and
 (ii) providing an effective amount of at least one metal rare-earth cation selected from the class consisting of cerium, lanthanum, praseodymium, neodymium, promethium, samarium, europium, gadolinium, terbium, dysprosium, holmium, erbium, thulium, ytterbium, lutetium and mixtures thereof.

It is understood that in addition to steps (i) and (ii) that combinations of steps (i) and (ii) for one or more times in any order are within the scope of this invention.

LZ-210-A is prepared by treating an LZ-210 material having a $SiO_2$ to $Al_2O_3$ ratio of greater than 7.0 with an effective amount of at least one Group IIIA cation by teatment with a solution of a Group IIIA salt (including organometallic compounds) under effective ion-exchange conditions. The term "Group IIIA cation" is meant to denominate hydroxylated cations, complexed cations, solvated cations and the like of Group IIIA (aluminum, gallium, indium and thallium). Such effective conditions will result in an average of at least one Group IIIA cation being provided to the LZ-210 material per every unit cell, preferably at least 2 per every unit cell and most preferably at least 3 per unit cell. Although the Group IIIA cation exchange conditions are not critical, typical exchange conditions would be to exchange to LZ-210 in an aqueous slurry of a water soluble Group IIIA salt at a temperature between about 20° C. and about 120° C. for a period greater than about 0.25 hour at atmospheric pressure. The Group IIIA salt can be most any salt which contains Group IIIA cations in solution, preferably aqueous solution, and it may be nitrates, chlorides, organic salts and the like. Preferably the salt is an aluminum salt. Although water is the preferred solvent for the Group IIIA salt it is within the scope of this invention to employ organic solvents, inorganic solvents, and mixtures of organic and inorganic solvents.

LZ-210-A may be subjected to further treatments including thermal treatment and ion-exchange with ammonium and/or multivalent cations other than Group IIIA cations in the same manner as was carried out for LZ-210-T and LZ-210-M.

In addition to the above, the catalyst(s) may be ammonium exchanged either before or after either of steps (i) or (ii). The ion exchange step(s) (either ammonium or multivalent cation) is generally carried out by preparing a slurry of LZ-210 or the LZ-210 derived zeolite (LZ-210-T, LZ-210-M or LZ-210-A) by adding about 5 to 15 volumes of water per volume of catalyst, after which a solution of a salt is added. The ion exchange is generally carried out at room temperature and the resulting solution is then heated to above about 50° C. and stirred at this temperature for about 0.5 to 3 hours. This mixture is then filtered and water washed to remove excess anion present as a result of the solution of the salt.

Catalysts LZ-210, LZ-210-A, LZ-210-T and LZ-210-M are typically employed with inorganic oxide matrix in an amount between about 1 percent and about 99 percent by weight and preferably between about 1 percent and about 90 percent by weight based on the total weight of matrix and zeolite. Such matrix systems and their preparation are well known in the art.

HT PROCESS

The HT Process of this invention relates to both a two step regeneration process and to a one step regeneration process. In general, the HT Process involves cracking residual oils boiling at 400° F. or higher. These residual oils may be obtained from crude oil, shale oil and tar sands to produce gasoline as well as lower and higher boiling hydrocarbon components, i.e. liquid motor fuels. The residual oil feed is mixed in a riser reaction zone with a highly active cracking catalyst recovered from a regeneration zone at a temperature above the feed pseudo-critical temperature. The hydrocarbon feed which has been preheated to a temperature below 800° F. is then mixed with the regenerated catalyst under conditions to form a generally vaporous hydrocarbon-catalyst suspension. A separation device or arrangement employed at the riser discharge separates from about 70–90% of the catalyst from the vapors. The unique feature of a particular device employed is that it allows higher than usual vapor superficial velocities in the disengaging vessel before the vapors enter the reactor cyclones. Hydrocarbons leaving the reactor cyclones are separated in a downstream fractionation column. The spent catalyst recovered from the riser operation following stream stripping thereof to remove entrained hydrocarbons and at a temperature in the range of about 900° F. to about 1100° F. and deactivated by 1.0 wt. % to 2.5 wt. % of coke, is passed to a temperature restricted dense fluid bed of catalyst in a first stage catalyst regeneration zone.

The operation of the two-step regeneration operation of the HT Process is described in U.S. Pat. No. 4,331,533, column 8, lines 9 to column 10, line 23, inclusive and the claims incorporated herein by reference thereto. The instant process comprises the improvement of the use of such a two-step regeneration operation with a catalyst comprising LZ-210, LZ-210 -M, LZ-210-T and/or LZ-210-A.

In general the two-step regeneration process comprises converting high boiling hydrocarbons comprising topped crudes, atmospheric tower bottoms, residual oils, tar sand, shale oils and gas oils comprising one or more of asphaltenes, polycyclic aromatics and metal contaminants which comprises, catalytically cracking said high boiling hydrocarbons initially mixed in a cracking zone with hot regenerated catalyst at a temperature at least equal to the pseudo-critical temperature of the hydrocarbon feed, separating catalyst particles comprising hydrocarbonaceous deposits from hydrocarbon conversion products and separately recovering each, partially regenerating separated catalyst particles comprising hydrocarbonaceous deposits in a first catalyst regeneration zone under conditions of oxygen concentration and temperature selected to burn paticularly hydrogen associated with hydrocarbonaceous material thereby leaving residual carbon on the catalyst and produce a CO rich flue gas thereafter recovered from said catalyst partial regeneration operation, passing catalyst particles thus partially regenerated and comprising residual carbon deposits to a second separate catalyst regeneration zone at a temperature above 1500° F. in the presence of sufficient oxygen to substantially completely burn residual carbon deposits, CO and produce a $CO_2$ rich flue gas, recovering regenerated catalyst substantially free of residual carbon thereon at a temperature above the pseudo-critical temperature of said hydrocarbon feed to be catalytically converted by the catalyst, and passing catalyst thus regenerated from said second regeneration zone to said cracking zone to form a mix temperature at least equal to the pseudo-critical temperature of charged hydrocarbon feed as above defined.

In a further embodiment the process comprises operation with respect to feeds processed, catalyst regeneration and provides a high temperature operation for processing high boiling heavy residual oils in a riser cracking zone of a process by: providing a riser cracking zone in combination with an added second regeneration zone, said second regeneration zone adjacent to but above said restricted temperature regeneration zone; passing a suspension of hydrocarbon product vapor and catalyst flowing traverse of the riser cracking zone into a suspension breaking zone which promotes the downward flow of separated catalyst particles from product vapors entraining catalyst particles, passing the product vapors through a passageway immediately adjacent the suspension breaking zone in open communication with a cyclone separation zone, separating hydrocarbon product vapors from catalyst in said cyclone separation zone and recovering said hydrocarbon product vapors separately from cyclone separated catalyst, stripping catalyst separated from hydrocarbon vapors before downward passage thereof to a lower portion of a dense fluid bed of catalyst in said temperature restricted regeneration zone; effecting a partial regeneration of the catalyst in a dense fluid catalyst bed in said temperature restricted regenerating zone up to 1400° F. with an amount of oxygen sufficient to effect from 10 to 90 wt% removal of carbonaceous material and produce a flue gas rich in CO and provide catalyst particles with a residual carbon thereon, passing the partially regenerated catalyst through an external stripping zone and thence through a confined transfer zone to a bottom portion of the upper regeneration zone; and further regenerating the partially regenerated catalyst comprising residual carbon in a dense fluid catalyst bed in the second regeneration zone at a temperature greater than 1500° F., and passing high temperature regenerated catalyst from said second regeneration zone through an external stripping zone before passage to said riser cracking zone for admixture with said high boiling heavy feed oil charged thereto.

The instant process also comprises the use of a single stage regeneration operation where the cracking catalyst comprising LZ-210, LZ-210-T, LZ-210-M and/or LZ-210-A is regenerated in a regeneration zone at a temperature above 1500° F. in the presence of sufficient oxygen to substantially completely burn hydrogen associated with hydrocarbonaceous material and residual carbon and CO produced therefrom, recovering the regnerated catalyst substantially free of residual carbon, i.e, less than 0.05 and preferably less than 0.02 weight % carbon, thereon at a temperature above the pseudo-critical temperature of said hydrocarbon feed and passing the regenerated catalyst to the cracking zone. The use of a catalyst comprising LZ-210, LZ-210-T, LZ-210-M and/or LZ-210-A enables a single step regeneration operation for the a process employing high temperature cracking and high temperature regeneration which heretofore was not deemed possible owing to the limited thermal stability of the zeolitic components employed in conventional cracking catalysts. Further, salt impurities in the feedstock and from preparation of zeolite catalysts provide deliterious amounts of sodium which are known to decrease the crystallinity and, accordingly, the activity of the zeolitic components of cracking catalysts. Further, the feedstock often contains metals such as nickel and vanadium which tend to adversely affect the catalyst. A catalyst with improved tolerance to sodium and/or vanadium and nickel would provide a process with lower catalyst makeup by virtue of its improved stability in the presence of sodium and/or vanadium and nickel. The instant process provides catalysts having such improved tolerance to sodium, vanadium and nickel. Further, steam may be employed both in the cracking steps and as the aerating gas in the instant process whereas less stable zeolites cannot tolerate the presence of such steam.

The general operation of the HT Process is described in U.S. Pat. Nos. 4,331,533 and 4,332,674 and the figures thereof as above discussed. The use of a single-stage regeneration will be substantially the same as the second stage of the two-stage regeneration operation except that the regeneration time and temperature will be correlated to provide a regenerated catalyst with preferably less than 0.02 weight percent residual carbon on the catalyst and a regenerated catalyst which is substantially hydrogen free.

The improved thermal and hydrothermal stability of LZ-210, LZ-210-M, LZ-210-T and LZ-210-A is disclosed in the patent applications, supra, relating to these zeolites. This improved thermal and/or hydrothermal stability of LZ-210, LZ-210-M, LZ-210-T and/or LZ-210-A provides, at least in part, the improved process of this invention.

Another important feature of the instant process, aforementioned, is the improved tolerance of the zeolites used in the instant process for sodium, vanadium and nickel. This improved tolerance for sodium can be demonstrated by comparing the crystal retention of LZ-210 and LZ-210-A and a commercially available Y zeolite with varying amounts of $Na_2O$. The commercially available Y zeolite was evaluated by varying the $Na_2O$ content as shown in Table I. The zeolite Y had a $SiO_2/Al_2O_3$ ratio of about 5.0. The zeolite Y samples were ammonium exchanged by refluxing with a 1/1/10 weight ratio of the Y zeolite to ammonium chloride to water to achieve the wt% $Na_2O$ set forth in Table I. The reflux procedure was carried out to provide the indicated $Na_2O$ levels. LZ-210 and LZ-210-A were prepared according to the procedure described in U.S. Ser. Nos. 315,853 and 500,446, respectively to give $SiO_2/Al_2O_3$ ratios as hereinafter set forth in Table I.

The hydrothermal stability of the zeolite Y samples and the LZ-210 and LZ-210-A samples were evaluated by measuring the average crystal retention of hydrothermally treated samples containing varying amounts of $Na_2O$.

The hydrothermal treatment was carried out in a horizontal tube furnace fitted with a Vycor furnace tube connected to a steam generator set to produce 23%±2% steam in air at a flow-rate of 2.5 cubic feet per hour. The "hot zone" of the furnace was preheated in the gas flow to 873° C.±4° C. before the zeolite samples were introduced to the furnace. The zeolite was introduced into the furnace by placing about 2 grams of the hydrated sample into a shallow 3-inch long ceramic boat and then thrusting it into the hot zone of the furnace tube. In each case the sample boats were tied together and each experiment contained a reference catalyst which was the ammonium exchanged Y zeolite, as above described. After a heating period of five (5) hours in 23%±2% steam the furnace was opened and the hot catalysts removed. The catalysts were hydrated at room temperature in a water containing chamber for at least 48 hours. The catalysts were analyzed to determine their $O_2$ capacity, surface area and XRD peak area before and after the hydrothermal treatment. The "Average Crystal Retention" is the average value of these measured values based on the change of each of these factors. The results of these measurements are shown in Tables I and II. The data in Table I show that zeolite Y was adversely affected, i.e., crystallinity degraded, by the hydrothermal treatment in the presence of $Na_2O$ to a greater extent than were the LZ-210 ($SiO_2$ to $Al_2O_3$ greater than 8.0) and LZ-210-A ($SiO_2$ to $Al_2O_3$ greater than 7.0) samples, as shown by the data for LZ-210 and LZ-210-A in Table II. At comparable $Na_2O$ levels LZ-210 and LZ-210-A samples demonstrated a higher value for the Average Crystal Retention showing a markedly superior tolerance for $Na_2O$.

TABLE I

| % $Na_2O$ in Y-Zeolite | Average Crystal Retention (%) |
| --- | --- |
| 2.53 | 0.3 |
| 2.25 | 2.9 |
| 1.16 | 8.2 |
| 0.50 | 20.5 |
| 0.36 | 14.4 |
| 0.30 | 23.9 |
| 0.10 | 36.7 |

TABLE II

| Zeolite | Initial $SiO_2/Al_2O_3$ | % $Na_2O$ | Average Crystal Retention (%) |
| --- | --- | --- | --- |
| LZ-210 | 6.5 | 2.3 | 1.1 |
| LZ-210 | 6.5 | 0.38 | 50.9 |
| LZ-210 | 7.4 | 1.28 | 3.2 |
| LZ-210 | 7.4 | 0.26 | 66.9 |
| LZ-210 | 8.4 | 1.13 | 53.6 |
| LZ-210 | 8.4 | 0.05 | 72.2 |
| LZ-210 | 9.1 | 1.2 | 35.5 |
| LZ-210 | 9.1 | 0.15 | 76.6 |
| LZ-210 | 11.0 | 0.39 | 70.6 |
| LZ-210 | 11.0 | 0.01 | 90.3 |
| LZ-210 | 19.0 | 4.45 | 36.1 |
| LZ-210 | 19.0 | 0.18 | 89.8 |
| LZ-210-A[1] | 7.4 | 1.55 | 54.9 |
| LZ-210-A[2] | 8.4 | 1.0 | 76.2 |
| LZ-210-A[3] | 9.1 | 0.9 | 71.0 |

[1]The aluminum exchange added 2.6 weight % aluminum which was not used in calculating the initial $SiO_2/Al_2O_3$ ratio.
[2]The aluminum exchange added 3.6 weight % aluminum which was not used in calculating the initial $SiO_2/Al_2O_3$ ratio.
[3]The aluminum exchange added 2.7 weight % aluminum which was not used in calculating the initial $SiO_2/Al_2O_3$ ratio.

What is claimed is:

1. In a method for converting hydrocarbons comprising residual oils which comprises charging hot particles of catalyst at a temperature above 1400° F. and at least equal to the pseudo-critical temperature of a hydrocarbon feed comprising residual oils to the lower portion of a riser conversion zone for flow upwardly therethrough, charging the hydrocarbon feed comprising residual oils to said riser conversion zone as a multiplicity of separate streams so as to substantially completely vaporize vaporizable components of the feed whereby thermal and catalytic cracking of the feed is accomplished and recovering a hydrocarbon product of said thermal and catalytic cracking of the feed separate from catalyst particles the improvement comprising employing a catalyst comprising a zeolitic aluminosilicate selected from the group consisting of LZ-210, LZ-210-M, LZ-210-T, LZ-210-A and mixtures thereof.

2. In a method for cracking a heavy oil comprising polycyclic aromatics, asphaltenes and metal contaminants which comprises, contacting the heavy oil with catalyst particles to form a suspension at a temperature above the heavy oil pseudo-critical temperature and contact conditions to obtain substantially complete vaporization of the heavy oil in combination with thermal and catalytic cracking thereof, and recovering hydrocarbon products of said thermal and catalytic cracking separate from catalyst particles, the improvement comprising employing a catalyst comprising a zeolitic aluminosilicate selected from the group consiting of LZ-210, LZ-210-M, LZ-210-T, LZ-210-A and mixtures thereof.

3. In a method for converting crude oil boiling above 400° F. which comprises mixing a sufficient amount of catalyst particles at a temperature above 1400° F. and at least equal to the crude oil pseudo-critical temperature charged as a plurality of separate oil streams and admixed with a diluent material to obtain substantially instantaneous vaporization of the charged crude oil by catalyst substantially concomitantly with thermal and catalytic cracking thereof, and recovering products of said cracking separate from catalyst particles, the improvement which comprises employing a catalyst comprising a zeolitic aluminosilicate selected from the group consiting of LZ-210, LZ-210-M, LZ-210-T, LZ-210-A and mixtures thereof.

4. In a method for effecting conversion of a residual oil by mixing a residual oil preheated to a temperature up to about 800° F. with a sufficient amount of catalyst particles at an elevated temperature above the residual oil pseudo-critical temperature to obtain substantially instantaneous vaporization of the residual oil feed along with thermal and catalytic cracking thereof and recovering products of said cracking comprising gasoline, higher and lower boiling hydrocarbon products separate from catalyst particles, the improvement comprising employing a catalyst comprising a zeolitic aluminosilicate selected from the group consiting of LZ-210, LZ-210-M, LZ-210-T, LZ-210-A and mixtures thereof.

5. In a method for catalytically converting high boiling hydrocarbons comprising topped crudes, atmospheric tower bottoms, residual oils, tar sands, shale oils and gas oils comprising one or more of asphaltenes, polycyclic aromatics and metal contaminants which comprises, catalytically cracking said high boiling hydrocarbons initially mixed in a cracking zone with hot regenerated catalyst at a temperature at least equal to the pseudo-critical temperature of the hydrocarbon feed, separating catalyst particles comprising hydrocarbonaceous deposits from hydrocarbon conversion products and separately recovering each, partially regenerating separated catalyst particles comprising hydrocarbonaceous deposits in a first catalyst regeneration zone under conditions of oxygen concentration and temperature selected to burn particularly hydrogen associated with hydrocarbonaceous material thereby leaving residual carbon on the catalyst and produce a CO rich flue gas thereafter recovered from said catalyst partial regeneration operation, passing catalyst particles thus partially regenerated and comprising residual carbon deposits to a second separate catalyst regeneration zone, further regenerating the partially regenerated catalyst in the second regeneration zone at a temperature above 1500° F. in the presence of sufficient oxygen to substantially completely burn residual carbon deposits and CO and produce a $CO_2$ rich flue gas, recovering regenerated catalyst substantially free of residual carbon thereon at a temperature above the psuedo-critical temperature of said hydrocarbon feed to be catalytically converted by the catalyst, and passing catalyst thus regenerated from said second regeneration zone to said cracking zone to form a mix temperature at least equal to said psuedo-critical temperature of charged hydrocarbon feed, the improvement which comprises employing a catalyst comprising a zeolitic aluminosilicate selected from the group consiting of LZ-210, LZ-210-M, LZ-210-T, LZ-210-A and mixtures thereof.

6. The process of claims 1,2,3,4 or 5 wherein said zeolitic aluminosilicate is LZ-210 having a $SiO_2$ to $Al_2O_3$ ratio greater than 8.0.

7. The process of claims 1,2,3,4 or 5 wherein said zeolitic aluminosilicate is LZ-210-T having a $SiO_2$ to $Al_2O_3$ ratio greater than 8.0.

8. The process of claims 1,2,3,4 or 5 wherein said zeolitic aluminosilicate is LZ-210-M having a $SiO_2$ to $Al_2O_3$ ratio greater than 6.0 and less than 8.0.

9. The process of claims 1,2,3,4 or 5 wherein said zeolitic aluminosilicate is LZ-210-A having a $SiO_2$ to $Al_2O_3$ ratio greater than 7.0.

10. The process of claim 4 or claim 5 wherein the regenerated catalyst is at a temperature within the range of 1400° F. to 1800° F.

11. The method of claim 5 wherein the second stage catalyst regeneration operation is effected at a higher temperature than said first stage regeneration.

12. The method of claim 5 wherein said hydrocarbon conversion products comprise gasoline.

13. The method of claim 5 wherein the catalyst employed is spherical.

14. The process of claims 1,2,3,4 or 5 wherein the zeolitic aluminosilicate is defined as having a chemical composition expressed in terms of mole fractions of framework tetrahedra as:

$$[Al_{(a-N)}Si_{b+(N-\Delta z)}\square_z]O_2$$

wherein;

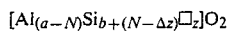

has a value greater than 3, the change in defect structure factor $\Delta z$ is less than 0.08; an increased silicon content in the framework, $(N-\Delta z)/N$, of at least 0.5; and a cation equivalent expressed as a monovalent cation species, $N^+/Al$, from 0.85 to 1.1 and the characteristic crystal structure of zeolite Y as indicated by an X-ray powder diffraction pattern having at least the d-spacings set forth broadly in Table A.

15. The process of claim 14 wherein the change in defect structure $\Delta z$ is less than 0.05.

16. The process of claim 14 wherein the cation equivalent expresses a multivalent cation species, $M^{+n}/Al$, where n is 2 or 3.

17. The process of claim 14 wherein $$\frac{b + (N - \Delta z)}{(a - N)}$$

is greater than 3.5.

18. The process of claim 17 wherein $$\frac{b + (N - \Delta z)}{(a - N)}$$

is greater than 4.0.

19. In a method for improving the operation with respect to feeds processed, catalyst regeneration and providing a high temperature operation for processing high boiling heavy residual oils in a riser cracking zone of a process comprising:

providing a riser cracking zone in combination with an added second regeneration zone, said second regeneration zone adjacent to but above a restricted temperature regeneration zone, passing a suspension of hydrocarbon product vapor and catalyst flowing traverse of the riser cracking zone into a suspension breaking zone which promotes the downward flow of separated catalyst particles from product vapors entraining catalyst particles, passing the product vapors through a passageway immediately adjacent the suspension breaking zone in open communication with a cyclone separation zone, separating hydrocarbon product vapors from catalyst in said cyclone separation zone and recovering said hydrocarbon product vapors separately from cyclone separated catalyst, stripping catalyst separated from hydrocarbon vapors before downward passage thereof to a lower portion of a dense fluid bed of catalyst in said temperature restricted regeneration zone;

effecting a partial regeneration of the catalyst in a dense fluid catalyst bed in said temperature restricted regenerating zone up to 1400° F. with an amount of oxygen sufficient to effect from 10 to 90 wt% removal of carbonaceous material and produce a flue gas rich in CO and provide catalyst particles with a residual carbon thereon, passing the partially regenerated catalyst through an external stripping zone and thence through a confined transfer zone to a bottom portion of the upper regeneration zone;

further regenerating the partially regenerated catalyst comprising residual carbon in a dense fluid catalyst bed in the second regeneration zone at a temperature greater than 1500° F., and passing high temperature regenerated catalyst from said second regeneration zone through an external stripping zone before passage to said riser cracking zone for admixture with said high boiling heavy feed oil charged thereto;

wherein the improvement comprises employing a catalyst comprising a zeolitic aluminosilicate selected from the group consisting of LZ-210, LZ-210-M, LZ-210-T, LZ-210-A and mixtures thereof.

20. The method of claim 19 wherein the said partial regeneration and further regeneration are carried out at a temperature above 1600° F.

21. The method for catalytically converting high boiling hydrocarbons comprising topped crudes, atmospheric tower bottoms, residual oils, tar sands, shale oils and gas oils comprising one or more of asphaltenes, polycyclic aromatics and metal contaminants which consisting essentially of catalytically cracking said high boiling hyrocarbons initially mixed in a cracking zone with hot regenerated catalyst at a temperature at least equal to the psuedo-critical temperature of the hydrocarbon feed, separating catalyst particles comprising hydrocarbonaceous deposits from hydrocarbon conversion products and separately recovering each, stream stripping the catalyst, regenerating separated catalyst particles comprising hydrocarbonaceous deposits in a catalyst regeneration zone under conditions of oxygen concentration and temperature selected to burn hydrogen and associated hydrocarbonaceous material and residual carbon produced therefrom, said temperature being above 1500° F. to substantially completely burn residual carbon deposits and CO and produce $CO_2$ rich flue gas, recovering regenerated catalyst substantially free of residual carbon thereon at a temperature above the psuedo-critical temperature of said hydrocarbon feed to be catalytically converted by the catalyst, and passing catalyst thus regenerated from said regeneration zone to said cracking zone to form a mix temperature at least equal to the psuedo-critical temperature of charged hydrocarbon feed as above defined, wherein the catalyst comprises a zeolitic aluminosilicate selected from the group consisting of LZ-210, LZ-210-M, LZ-210-T, LZ-210-A and mixtures thereof.

22. The process of claim 21 wherein the zeolitic aluminosilicate is defined as having a chemical composition expressed in terms of mole fractions of framework tetrahedra as:

$$[Al_{(a-N)}Si_{b+(N-\Delta z)}\square_z]O_2$$

wherein;

$$\frac{b + (N - \Delta z)}{a - N}$$

has a value greater than 6.0 the change in defect structure factor $\Delta z$ is less than 0.08; an increased silicon content in the framework, $(N-\Delta z)/N$, of at least 0.5; and a cation equivalent expressed as a monovalent cation species, $M+/Al$, from 0.85 to 1.1 and the characteristic crystal structure of zeolite Y as indicated by an X-ray powder diffraction pattern having at least the d-spacings set forth broadly in Table A.

23. The process of claim 22 wherein "$\Delta z$" is less than 0.05.

24. The process of claim 22 wherein $$\frac{b + (N - \Delta z)}{a - N}$$

has a value greater than 3.5.

25. The process of claim 24 wherein $$\frac{b + (N - \Delta z)}{a - N}$$

has a value greater than 4.0.

26. The process of claim 21 wherein said regeneration is carried out in the presence of steam.

* * * * *

UNITED STATES PATENT AND TRADEMARK OFFICE
CERTIFICATE OF CORRECTION

PATENT NO. : 4,534,853
DATED : August 13, 1985
INVENTOR(S) : Long, et al

It is certified that error appears in the above-identified patent and that said Letters Patent is hereby corrected as shown below:

Column 6, line 56, "in situ" should read -- *in situ* --.

Column 9, line 12, "60" should read -- *60* --.

Column 10, line 27, change "an" to -- and --.

Column 12, line 18, change "ay" to -- any --.

Column 13, line 45, "in situ" should read -- *in situ* --.

Column 15, line 26, "stream" should read -- steam --.

Column 15, line 38, "LZ-210 -M," should read -- LZ-210-M, --

Column 16, line 54, "regnerated" should read -- regenerated --.

Column 16, line 61, after "for" remove -- the --.

Column 19, line 14, "consiting" should read -- consisting --.

Column 20, line 4, "psuedo" should read -- pseudo --.

Column 20, line 9, "psuedo" should read -- pseudo --.

Column 20, line 12, "consiting" should read -- consisting --.

Column 20, line 53, "$N^+/Al$," should read -- $M^+/Al$, -- .

UNITED STATES PATENT AND TRADEMARK OFFICE
CERTIFICATE OF CORRECTION

PATENT NO. : 4,534,853

DATED : August 13, 1985

INVENTOR(S) : Long, et al

It is certified that error appears in the above-identified patent and that said Letters Patent is hereby corrected as shown below:

Column 22, line 3, "psuedo" should read -- pseudo --.

Column 22, line 6, "stream" should read -- steam --.

Column 22, line 17, "psuedo" should read -- pseudo --.

Column 22, line 21, "psuedo" should read -- pseudo --.

Column 22, line 39, "6.0" should read -- 3.0 --.

Signed and Sealed this

Fourth Day of February 1986

[SEAL]

Attest:

Attesting Officer

DONALD J. QUIGG

Commissioner of Patents and Trademarks